United States Patent
Qiu et al.

(10) Patent No.: US 12,449,258 B2
(45) Date of Patent: Oct. 21, 2025

(54) BROADBAND RESONATOR OPTICAL GYROSCOPE WITH EFFICIENT OPTICAL POWER MANAGEMENT FOR LOW SHOT NOISE

(71) Applicant: Honeywell International Inc., Charlotte, NC (US)

(72) Inventors: Tiequn Qiu, Glendale, AZ (US); Jianfeng Wu, Tucson, AZ (US); Glen A. Sanders, Scottsdale, AZ (US); Matthew Wade Puckett, Phoenix, AZ (US); Steven Tin, Edina, MN (US); Marc Smiciklas, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 264 days.

(21) Appl. No.: 18/356,186

(22) Filed: Jul. 20, 2023

(65) Prior Publication Data

US 2025/0027771 A1   Jan. 23, 2025

(51) Int. Cl.
  *G01C 19/72* (2006.01)
  *G01C 19/62* (2006.01)
  *H01S 3/067* (2006.01)

(52) U.S. Cl.
  CPC .......... *G01C 19/721* (2013.01); *G01C 19/62* (2013.01); *H01S 3/067* (2013.01)

(58) Field of Classification Search
  CPC .... G01C 19/721; G01C 19/62; G01C 19/727; G01C 19/725; G01C 19/00; H01S 3/067
  See application file for complete search history.

(56) References Cited

U.S. PATENT DOCUMENTS 5,142,660 A   8/1992  Chang et al.
5,237,387 A   8/1993  Sanders
(Continued)

FOREIGN PATENT DOCUMENTS

| CN | 109282805 A | 1/2019 |
| CN | 115112111 A | 9/2022 |
| WO | 2023280992 A1 | 1/2023 |

OTHER PUBLICATIONS

European Patent Office, "Extended European Search Report", dated Jan. 2, 2025, from EP Application No. 24184668.2, from Foreign Counterpart to U.S. Appl. No. 18/356,186, pp. 1 through 11, Published: EP.

(Continued)

*Primary Examiner* — Jonathan M Hansen
(74) *Attorney, Agent, or Firm* — Fogg & Powers LLC

(57) ABSTRACT

A method of operating a resonator optical gyroscope includes generating optical signals having a broadband frequency range. The method includes coupling the optical signals into an optical resonator (OR) to propagate in a first direction and coupling the optical signals out of the OR after the optical signals pass through the OR in the first direction. The method includes coupling optical signals into the OR to propagate in a second direction and coupling optical signals out of the OR after the optical signals pass through the OR in the second direction. The method includes amplifying the optical signals coupled out of the OR by the second optical coupler or the optical signals coupled out of the OR by the first optical coupler to generate amplified optical signals and generating electrical signals corresponding to the amplified optical signals. The method includes determining a rotation rate based on the electrical signals.

13 Claims, 6 Drawing Sheets

(56) References Cited

U.S. PATENT DOCUMENTS

| | | | |
|---|---|---|---|
| 9,115,993 B1 | 8/2015 | Dahlgren | |
| 9,207,082 B2 | 12/2015 | Qiu et al. | |
| 9,252,559 B2 | 2/2016 | Narayanan et al. | |
| 9,766,070 B2* | 9/2017 | Honthaas | G01C 19/64 |
| 9,891,500 B1* | 2/2018 | Chu | H01S 3/067 |
| 11,131,547 B2 | 9/2021 | Digonnet et al. | |
| 2005/0196103 A1* | 9/2005 | Kaplan | G02B 6/12007 |
| | | | 385/39 |
| 2015/0260520 A1* | 9/2015 | Qiu | G01C 19/727 |
| | | | 356/461 |
| 2015/0345949 A1* | 12/2015 | Honthaas | G01C 19/64 |
| | | | 356/477 |
| 2022/0034660 A1 | 2/2022 | Song et al. | |

OTHER PUBLICATIONS

Liu et al., "Performance of a resonant fiber-optic gyroscope based on a broadband source", Applied Optics, May 27, 2022, vol. 61, No. 16, pp. 4971 through 4979.

Zhao et al., "White-light-driven resonant fiber-optic gyro based on round trip filtering scheme", Optics Letters, Mar. 2022, vol. 47, No. 5, Feb. 22, 2022, pp. 1137 through 1140.

* cited by examiner

BROADBAND RESONATOR OPTICAL GYROSCOPE WITH EFFICIENT OPTICAL POWER MANAGEMENT FOR LOW SHOT NOISE

BACKGROUND

Resonator fiber optic gyroscopes (RFOGs) typically utilize narrow linewidth laser sources to generate the optical signals necessary for rotation rate measurements. An RFOG generally operates by propagating the optical signals generated by the laser through an optical resonator in counter-propagating directions. The resonance frequencies of the optical resonator are frequency-shifted due to the Sagnac effect when the RFOG experiences a rotation about its sense axis. The frequency shift of the resonance frequencies can then be used to determine the extent of rotation experienced by the RFOG.

SUMMARY

In some aspects, a resonator optical gyroscope includes a broadband light source configured to generate optical signals having a broadband frequency range. The resonator optical gyroscope further includes an optical resonator. The resonator optical gyroscope further includes a first optical coupler coupled to the optical resonator. The first optical coupler is configured to receive the optical signals from the broadband light source and couple the optical signals into the optical resonator such that the optical signals propagate in a first direction through the optical resonator. The first optical coupler is also configured to couple optical signals out of the optical resonator after the optical signals pass through the optical resonator in a second direction. The resonator optical gyroscope further includes a second optical coupler coupled to the optical resonator. The second optical coupler is configured to couple optical signals out of the optical resonator after the optical signals pass through the optical resonator in the first direction. The second optical coupler is also configured to couple optical signals into the optical resonator such that the optical signals propagate in the second direction through the optical resonator. The resonator optical gyroscope further includes a gain element configured to amplify optical signals that have been coupled out of the optical resonator and passed through the optical resonator in the first direction to generate amplified optical signals. The resonator optical gyroscope further includes a photodetector configured to convert the amplified optical signals from to corresponding electrical signals based on a power level of the amplified optical signals. The resonator optical gyroscope further includes one or more circuits configured to determine a rate of rotation based on the corresponding electrical signals.

In other aspects, a resonator optical gyroscope includes a broadband light source configured to generate optical signals having a broadband frequency range. The resonator optical gyroscope further includes an optical resonator. The resonator optical gyroscope further includes a first optical coupler coupled to the optical resonator. The first optical coupler is configured to receive the optical signals from the broadband light source and couple the optical signals into the optical resonator such that the optical signals propagate in a first direction through the optical resonator. The first optical coupler is also configured to couple optical signals out of the optical resonator after the optical signals pass through the optical resonator in a second direction. The resonator optical gyroscope further includes a second optical coupler coupled to the optical resonator. The second optical coupler is configured to couple optical signals out of the optical resonator after the optical signals pass through the optical resonator in the first direction. The second optical coupler is also configured to couple optical signals into the optical resonator such that the optical signals propagate in the second direction through the optical resonator. The resonator optical gyroscope further includes one or more gain elements configured to amplify optical signals that have been coupled out of the optical resonator by the second optical coupler and passed through the optical resonator in the first direction and/or optical signals that have been coupled out of the optical resonator by the first optical coupler and passed through the optical resonator in the second direction. The resonator optical gyroscope further includes a photodetector configured to convert amplified optical signals to corresponding electrical signals based on a power level of the amplified optical signals. The resonator optical gyroscope further includes one or more circuits configured to determine a rate of rotation based on the corresponding electrical signals.

In other aspects, a method of operating a resonator optical gyroscope includes generating, with a broadband light source, optical signals having a broadband frequency range. The method further includes coupling, with a first optical coupler, the optical signals into an optical resonator to propagate in a first direction. The method further includes coupling, with a second optical coupler, the optical signals out of the optical resonator after the optical signals pass through the optical resonator in the first direction. The method further includes coupling, with the second optical coupler, optical signals into the optical resonator to propagate in a second direction. The method further includes coupling, with the first optical coupler, optical signals out of the optical resonator after the optical signals pass through the optical resonator in the second direction. The method further includes amplifying, with one or more gain elements, the optical signals coupled out of the optical resonator by the second optical coupler or the optical signals coupled out of the optical resonator by the first optical coupler to generate amplified optical signals. The method further includes generating, with a photodetector, electrical signals corresponding to the amplified optical signals. The method further includes determining a rotation rate based on the electrical signals.

BRIEF DESCRIPTION OF THE DRAWINGS

Understanding that the drawings depict only some embodiments and are not therefore to be considered limiting in scope, the exemplary embodiments will be described with additional specificity and detail using the accompanying drawings, in which.

DETAILED DESCRIPTION

Figure 1A:
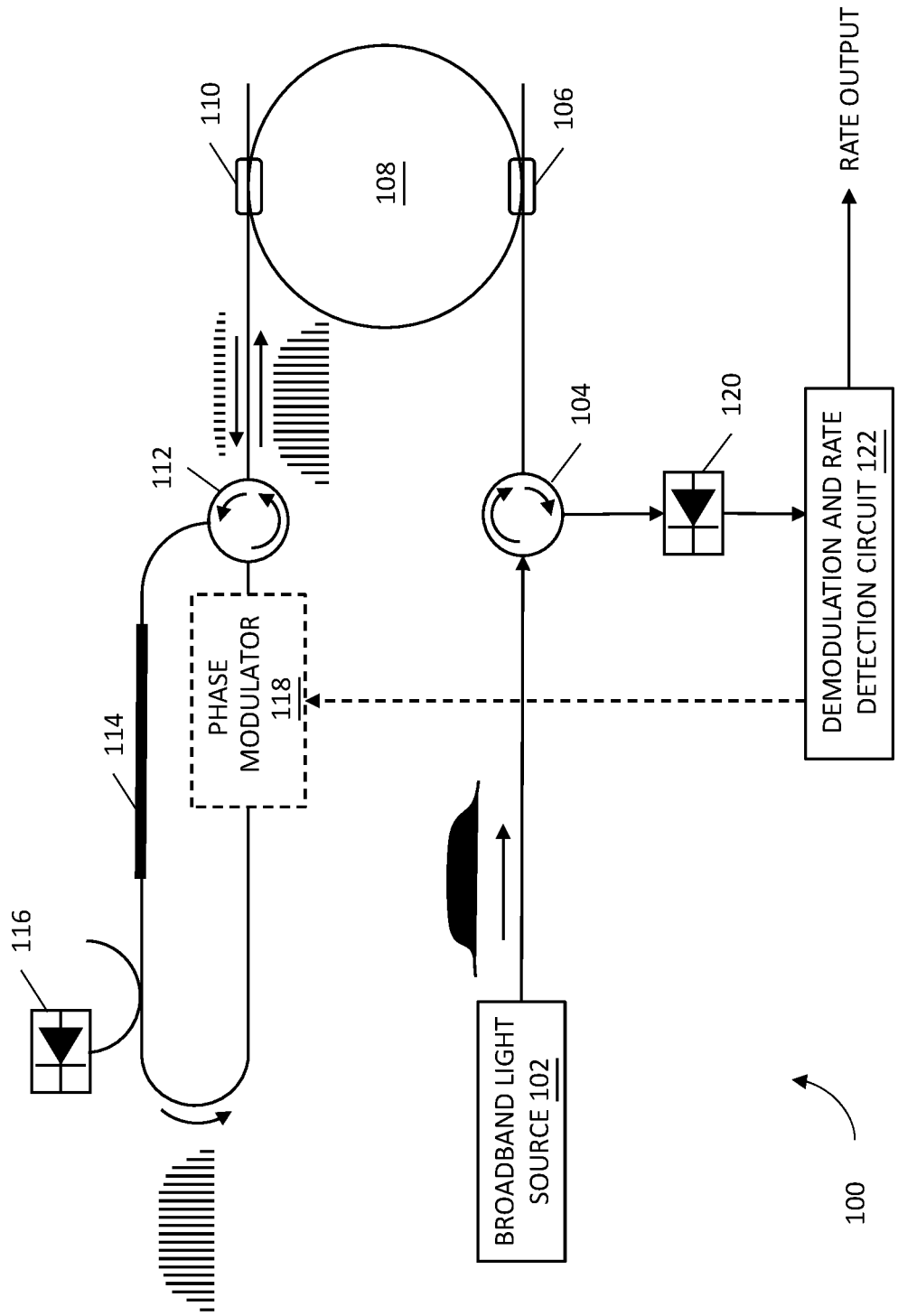
FIG. 1A is a block diagram of an example optical gyroscope.

In the following detailed description, reference is made to the accompanying drawings that form a part hereof, and in which are shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Signals generated by narrow linewidth lasers in RFOGs are generally susceptible to the optical Kerr effect, which is a nonlinear optical phenomenon that modifies the refractive index as a function of the intensity of the optical signal. A broadband laser (that is, a broad linewidth source that generates optical signals having a broadband frequency range) may reduce the optical Kerr effects present in the RFOG, but also may cause the output intensity of the optical signals to substantially decrease after propagating through the optical resonator due to the broadband nature of the laser source and the narrow resonance peaks of the optical resonator. The optical resonator essentially operates like a filter such that all non-resonant frequencies are filtered out. As a result, the optical signals output from the optical resonator may be too weak for the detection and processing circuitry to determine the rotation rate when using a broadband light source. For a high-precision RFOG, particularly when implemented on a chip, the reduction in power is very problematic since these gyroscopes require high finesse resonators for precision rate measurement, and the power of the optical signals output from the optical resonator is inversely proportional to the finesse of the resonator.

One option to overcome the losses from implementing a broadband light source is to utilize a broadband light source with high output power. While operable, this approach is not suitable for certain applications. For example, the total power consumption may be very high for such a high-power light source making them ill-suited for integrated photonics-based gyroscopes or other small scale RFOG designs.

The techniques described herein address the power losses by utilizing one or more gain elements at various positions on the optical path to amplify optical signals that have passed one or more times through the optical resonator in order to improve the detectable optical power without increasing the total power consumption of the gyroscope. In some examples, a gain element is configured to amplify optical signals that have passed through the optical resonator in a single direction and prior to coupling the optical signals back into the optical resonator. In some examples, a gain element is configured to amplify optical signals that have passed through the optical resonator in both directions and prior to the optical signals reaching the detector. Further improvements can be achieved by incorporating phase modulation to shift the frequency of the optical signals and/or polarizers to filter out undesirable polarization states.

FIG. 1A illustrates a block diagram of an example resonator optical gyroscope 100 in which the techniques for efficient optical power management for low shot noise can be implemented. In the example shown in FIG. 1A, the resonator optical gyroscope 100 includes various components, including a broadband light source 102, first circulator 104, first optical coupler 106, optical resonator 108, second optical coupler 110, second circulator 112, gain element 114, power monitor 116, phase modulator 118, photodetector 120, and a demodulation and rate detection circuit 122. Although not specifically labelled in FIG. 1A, the components of the resonator optical gyroscope 100 are coupled via suitable guided optics. For example, the components of the resonator optical gyroscope 100 can be coupled via optical waveguides and/or free space optics such as lenses, mirrors, and beam splitters. The resonator optical gyroscope 100 in some examples is implemented on an integrated photonics substrate, such as a photonics chip.

The resonator optical gyroscope 100 generally operates by propagating optical signals through different optical pathways, where they are ultimately processed to determine a rotation rate experienced by the demodulation and rate detection circuit 122 of the resonator optical gyroscope 100.

The broadband light source 102 is configured to generate the optical signals with a broadband frequency range. In some examples, the broadband light source 102 is a broadband laser configured to generate optical signals via amplified spontaneous emission (ASE). In some examples, the broadband light source 102 is a rare-earth doped fiber or other waveguide light source. For example, the broadband light source 102 can be a fiber doped with rare-earth ions such as erbium, ytterbium, or the like. In such examples, the broadband light source 102 is optically pumped (for example, using a 980 nm or 1480 nm pump lasers), absorbs the pump light, and emits the optical signals. In some examples, the broadband light source 102 can be a superluminescent laser diode, light emitting diode (LED), or the like. In any case, the optical signals generated by broadband light source 102 have a continuous broadband optical spectrum and low coherence. In some examples, the broadband light source 102 is configured to generate optical signals at a selected frequency/wavelength range or intensity that reduces the effects from the optical Kerr effect or renders such effects negligible.

In the example shown in FIG. 1A, the optical signals generated by the broadband light source 102 are provided to a first circulator 104. In the example shown in FIG. 1A, the first circulator 104 is a three-port device configured to output signals received at one port to another particular port. In the example shown in FIG. 1A, optical signals received from the broadband light source 102 at a first port are output to a second port coupled to the first optical coupler 106. In the example shown in FIG. 1A, optical signals received from the first optical coupler 106 at the second port are output to a third port connected to the photodetector 120.

The first circulator 104 is configured to provide the optical signals received from the broadband light source 102 to the first optical coupler 106, and the first optical coupler 106 is configured to couple at least a portion of the optical signals into the optical resonator 108. In some examples, the fiber extending past the first optical coupler 106 is angle cleaved in order to prevent back reflection of the portion of the optical signals that are not transmitted into the optical resonator 108. In other examples, an optical isolator or a similar device could also be used to prevent back reflection. In any case, the prevention of back reflection ensures that these signals do not interfere with the other signals that are received by the photodetector 120 (including the optical signals generated by broadband light source 102 and the amplified optical signals or phase-modulated, amplified optical signals, as further described herein).

The optical resonator 108 is configured to pass a portion of the coupled optical signals at one or more resonance frequencies of the optical resonator 108. When the first optical coupler 106 receives the optical signals from the first circulator 104, it directs the optical signals to propagate in a first direction in the optical resonator 108. In the example shown in FIG. 1A, the optical signals coupled into the optical resonator 108 by the first optical coupler 106 propagate in the counterclockwise (CCW) direction; however, in other examples the resonator optical gyroscope 100 can be designed such that the optical signals propagate initially in the clockwise (CW) direction. As the optical signals propagate in the optical resonator 108, some frequency components of the optical signals (particularly frequency components that are not near the resonance frequency of the optical resonator 108) will interfere destructively and not resonate. Thus, the frequency components of the optical signals that correspond to the resonance frequencies of the optical resonator 108 will get transmitted to the output port (second optical coupler 110), while other frequency components will not.

After propagating through the optical resonator 108, a portion of the optical signals are coupled out of the optical resonator 108 via a second optical coupler 110. The optical filtering of the optical signals in the first passage through the optical resonator 108 reshapes the broadband optical spectrum to match the optical resonator transmission lines. As shown in FIG. 1A, the optical signals coupled out of the optical resonator 108 have a significantly reduced power level and are channelized by the multiple resonances in the CCW direction.

The optical signals coupled out of the optical resonator 108 via the second optical coupler 110 are then sent to a second circulator 112. In the example shown in FIG. 1A, the second circulator 112 is a three-port device configured to output signals received at one port to another particular port. In the example shown in FIG. 1A, optical signals received from the second optical coupler 110 at a first port are output to a second port coupled to the gain element 114. In the example shown in FIG. 1A, optical signals received from the gain element 114 (or the phase modulator 118 if included) at a third port are output to the first port and then to the second optical coupler 110.

The gain element 114 (also referred to as a "gain medium") is configured to amplify the optical signals output from the optical resonator 108. In some examples, the gain element 114 is a rare-earth doped amplifier. For example, the gain element 114 can be a fiber or waveguide doped with rare-earth ions such as erbium, ytterbium, or the like. In such examples, the gain element 114 is optically pumped (for example, using a 980 nm or 1480 nm pump laser) in order to provide a desired level of amplification to the optical signals. In other examples, the gain element 114 is a semiconductor optical amplifier. In such examples, the gain element 114 is electrically pumped in order to provide the desired level of amplification of the optical signals.

In the example shown in FIG. 1A, the resonator optical gyroscope 100 includes a power monitor 116 configured to measure the power level of the amplified optical signals, and the amount of amplification provided by the gain element 114 to the optical signals is adjustable. In some examples, it is desirable to produce amplified optical signals at a particular power level during calibration and/or maintain an approximately constant output power using the gain element 114 during operation. In some examples, the pump power used for optical pumping of the gain element 114 (for example, where the gain element 114 is an EDFA) or the amount of current used for pumping of the gain element 114 (for example, where the gain element 114 is a SOA) can be adjusted based on power measurements from the power monitor 116. In some examples, the adjustment is made using a servo or other control circuit.

Regardless of the type of gain element 114 used in the resonator optical gyroscope 100, in some examples, the amount of optical or electrical pumping of the gain element 114 is selected, at least in part, based on the desired total power consumption of the resonator optical gyroscope 100. For example, the power consumption of pumping the gain element 114 can be limited based on a total power consumption of the resonator optical gyroscope 100 including the power consumption for pumping of the broadband light source 102 and operation of the phase modulator 118 (if included), photodetector 120, and the demodulation and rate detection circuit 122. By using the gain element 114 to amplify the optical signals after passing through the optical resonator 108, the amount of power used for the broadband light source 102 (for example, pump power) can be reduced and the power level of the amplified optical signals at the photodetector 120 will be significantly improved (for example, by orders of magnitude) even without increasing the power consumption of the resonator optical gyroscope 100 as a whole.

After amplification, the amplified optical signals are provided to the third port of the second circulator 112, which then passes the amplified optical signals back to the first port of the second circulator 112 and then the second optical coupler 110. The second optical coupler 110 is configured to couple at least a portion of the amplified optical signals into the optical resonator 108.

While some of the signal is coupled into the optical resonator 108, a residual amount of signal propagates toward the fiber extending past the second optical coupler 110. In some examples, the fiber extending past the second optical coupler 110 is angle cleaved in order to prevent back reflection of the portion of the amplified optical signals that are not transmitted into the optical resonator 108. In other examples, an optical isolator or a similar device could also be used to prevent back reflection. In any case, the prevention of back reflection ensures that these signals do not interfere with the other signals that are received by the second optical coupler 110.

The second optical coupler 110 couples the amplified optical signals in a second direction through the optical resonator 108. In the example shown in FIG. 1A, the amplified optical signals propagate in the CW direction. The amplified optical signals with frequency components corresponding to a resonance peak of the optical resonator 108 propagate through the optical resonator 108, while non-resonance frequency components are rejected.

After the amplified optical signals propagate through the optical resonator 108, the first optical coupler 106 is configured to couple a portion of the amplified optical signals out of the optical resonator 108, and the amplified optical signals are directed to the first circulator 104. Since the amplified optical signals are propagating in a direction towards the broadband light source 102 and received at the second port of the first circulator 104, the first circulator 104 acts as an isolator to direct the amplified optical signals to the photodetector 120 and prevent the amplified optical signals from propagating back to the broadband light source 102.

The amplified optical signals propagate from first circulator 104 to the photodetector 120. The photodetector 120 is configured to convert the amplified optical signals from an optical signal to a corresponding electrical signal, based on the power of the received amplified optical signals. The electrical signal corresponding to the amplified optical signals is then provided to a demodulation and rate detection circuit 122.

In order to determine the rotation rate, the demodulation and rate detection circuit 122 is configured to demodulate the electrical signal and determine the resonance frequency shift based on the power of the demodulated signal corresponding to the amplified optical signal. For example, the received electrical signal can be indicative of a power difference corresponding to a change in rotation rate.

In some examples, the resonator optical gyroscope 100 further includes a phase modulator 118 coupled between the gain element 114 and the second circulator 112. In some examples, the phase modulator 118 is configured to receive the optical signals from the second circulator 112 prior to amplification by the gain element 114 to compensate the loss introduced by the phase modulator 118. In other examples, such as the example shown in FIG. 1A, the phase modulator 118 is configured to receive the amplified optical signals from the gain element 114. For ease of explanation, only the example shown in FIG. 1A is described herein.

In the example shown in FIG. 1A, after amplification of the optical signals by the gain element 114, the amplified optical signals are provided to a phase modulator 118. The phase modulator 118 is configured to modulate the phase of the amplified optical signals based on a phase modulation signal that is applied on the amplified optical signals. In some examples, the phase modulator 118 is configured to generate phase-modulated, amplified optical signals using a sawtooth waveform. In some examples, phase modulator 118 is an electro-optic phase modulator. Utilizing such a phase modulator simplifies the architecture of the resonator optical gyroscope 100 compared to previous designs and reduces the size and cost of implementing phase modulation of the optical signals.

Once modulated by phase modulator 118, the modulated and amplified optical signals (referred to as "phase-modulated, amplified optical signals") are sent back to the optical resonator 108 in the reverse direction through the second circulator 112 and the second optical coupler 110. After modulation, the phase-modulated, amplified optical signals are provided to the third port of the second circulator 112. The phase-modulated, amplified optical signals received at the third port of the second circulator 112 are output to the first port of the second circulator 112, which then passes the phase-modulated, amplified optical signals back to the second optical coupler 110. The second optical coupler 110 is configured to couple at least a portion of the phase-modulated, amplified optical signals into the optical resonator 108.

After the phase-modulated, amplified optical signals propagate through the optical resonator 108, the first optical coupler 106 is configured to couple a portion of the phase-modulated, amplified optical signals out of the optical resonator 108, and the phase-modulated, amplified optical signals are directed to the first circulator 104. Since the phase-modulated, amplified optical signals are propagating in a direction towards the broadband light source 102 and received at the second port of the first circulator 104, the first circulator 104 acts as an isolator to direct the phase-modulated, amplified optical signals to the photodetector 120 and prevent the phase-modulated, amplified optical signals from propagating back to the broadband light source 102.

The phase-modulated, amplified optical signals propagate from first circulator 104 to the photodetector 120. The photodetector 120 is configured to convert the phase-modulated, amplified optical signals from an optical signal to a corresponding electrical signal, based on the power of the received phase-modulated, amplified optical signals. The electrical signal corresponding to the phase-modulated, amplified optical signals is then provided to a demodulation and rate detection circuit 122.

In some examples, the power level of the phase-modulated, amplified optical signals at the photodetector 120 can also be used to adjust the slope of the phase modulation signal at the phase modulator 118, and the slope difference between two successive periods of the phase modulation signal can be used to determine the frequency shift. The demodulation and rate detection circuit 122 can then determine the rotation rate based on the frequency shift.

In some examples, the resonator optical gyroscope 100 shown in FIG. 1A is configured to operate as a closed-loop optical gyroscope because the output from the optical resonator 108, indicative of a rotation rate, is also used as feedback to adjust the operation of the phase modulator 118 (wherein the "closed-loop" comprises the propagation of signals from the phase modulator 118 to, ultimately, the demodulation and rate detection circuit 122, and the control signals input to the phase modulator 118). In some examples, the demodulation and rate detection circuit 122 includes control circuitry configured to adjust the operation of phase modulator 118 based on the electrical signal from the photodetector 120. In some examples, the demodulation and rate detection circuit 122 configures at least one parameter of the phase modulator 118, such as the characteristics of the phase modulation signal used by the phase modulator 118 to modulate the optical signals. For example, as previously described, the demodulation and rate detection circuit 122 is configured to adjust the slope(s) of a sawtooth phase modulation signal based on a power change determined from the received electrical signal. The demodulation and rate detection circuit 122 can send control signals that configure the phase modulator 118. The serrodyne modulation (sawtooth phase modulation) shifts the frequency of the returning beam and makes the frequencies overlap with the CW resonance peaks of the optical resonator 108.

In response to receiving the control signals to adjust the slope of the phase modulation signal, the phase modulator 118 generates an adjusted phase modulation signal with the slope of the waveform corresponding to the parameters set by the demodulation and rate detection circuit 122. For example, the phase-modulated, amplified optical signal can have a frequency shift that corresponds to the shifted resonance frequency of the optical resonator 108 due to rotation. In this way, the resonator optical gyroscope 100 (and in particular the demodulation and rate detection circuit 122) can compensate for power changes (for example, rotation-induced changes) in the average power of phase-modulated, amplified optical signals that are detected by the demodulation and rate detection circuit 122.

In some examples, to reduce the rate measurement error, the optical resonator 108 can include polarizers (not shown) configured to filter out portions of the optical signals that correspond to undesirable polarization states. For example, the optical resonator 108 can include a polarizer (not shown) configured to filter out portions of the optical signals that correspond to unwanted polarization modes of the optical resonator 108. As a result, only the portion of the optical signals that correspond to a selected polarization mode of the optical resonator 108 are allowed to pass through the polarizer, and will get transmitted through each round trip through the optical resonator 108.

Figure 1B:
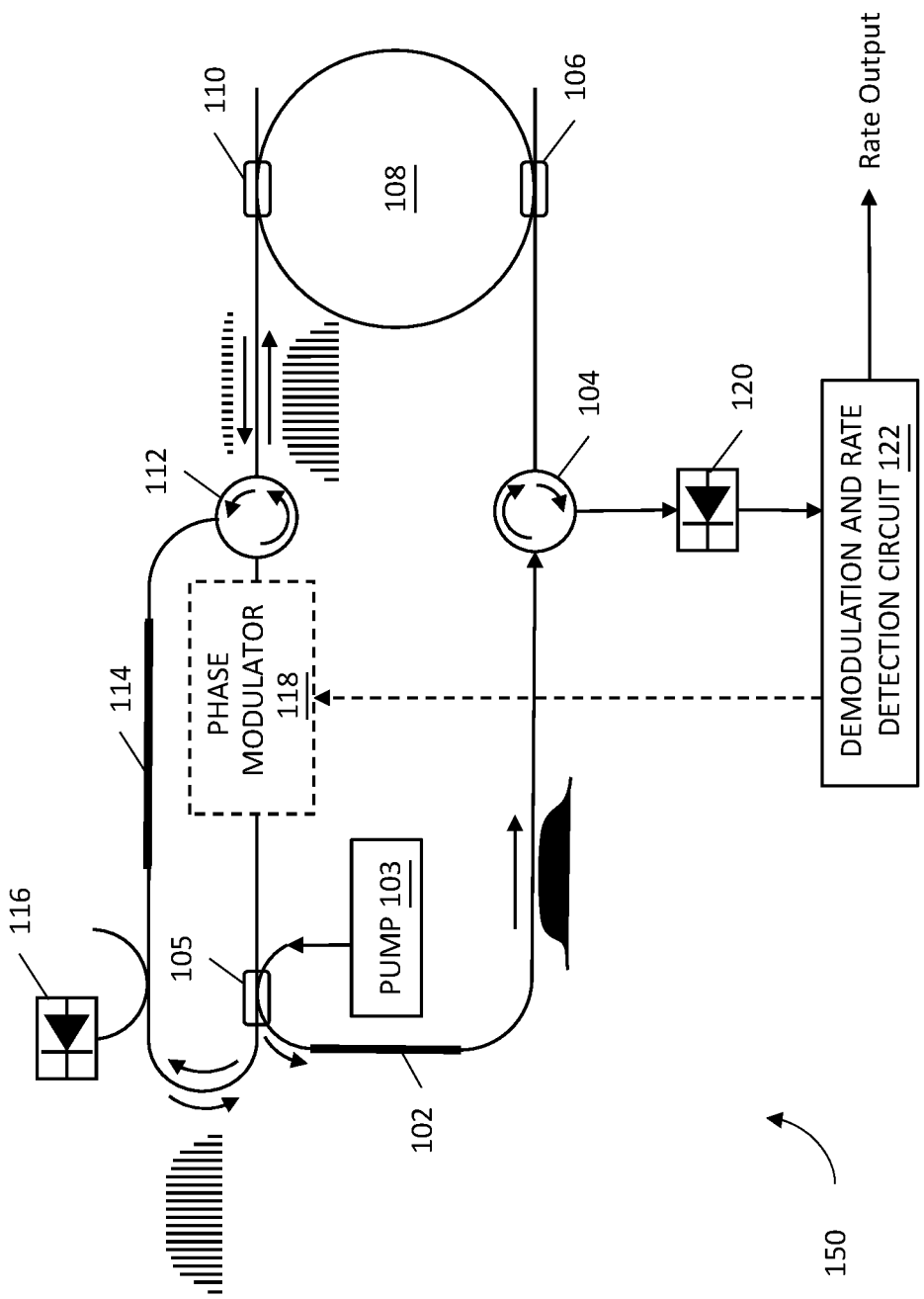
FIG. 1B is a block diagram of an example optical gyroscope.

FIG. 1B is a block diagram of another example resonator optical gyroscope 150 in which the techniques for efficient optical power management for low shot noise can be implemented. The resonator optical gyroscope 150 includes similar elements to the resonator optical gyroscope 100 described above with respect to FIG. 1A, so only the differences will be discussed. The functions, structures, and other description of elements for such examples described herein may apply to like named elements of resonator optical gyroscope 150 and vice versa.

In the example shown in FIG. 1B, the broadband light source 102 is a rare-earth doped fiber, and the gain element 114 is a rare-earth doped fiber amplifier. For example, the broadband light source 102 and the gain element 114 can each be a fiber doped with rare-earth ions such as erbium, ytterbium, or the like.

In the example shown in FIG. 1B, the broadband light source 102 and the gain element 114 are coupled to the same pump laser 103 via a coupler 105. The pump laser 103 is configured to optically pump both the broadband light source 102 and the gain element 114 via the coupler 105. In some examples, the pump laser 103 is a 980 nm or 1480 nm pump laser.

The coupler 105 can be configured to split the pump power from the pump laser 103 into different desired configurations. For example, the coupler 105 can be configured to implement a 50/50 split of the pump power such that 50% of the pump power is provided to the broadband light source 102 and 50% of the pump power is provided to the gain element 114. It should be understood that other ratios can be implemented by the coupler 105 as well depending on desired performance and design constraints.

In the example shown in FIG. 1B, the power monitor 116 configured to measure the power level of the amplified optical signals, and the amount of amplification provided by the gain element 114 to the optical signals is adjustable. In some examples, it is desirable to produce amplified optical signals at a particular power level during calibration and/or maintain an approximately constant output power using the gain element 114 during operation. In some examples, the pump power used for optical pumping of the gain element 114 and/or the split ratio implemented by the coupler 105 can be adjusted based on power measurements from the power monitor 116. In some examples, the adjustment is made using a servo or other control circuit.

Figure 2:
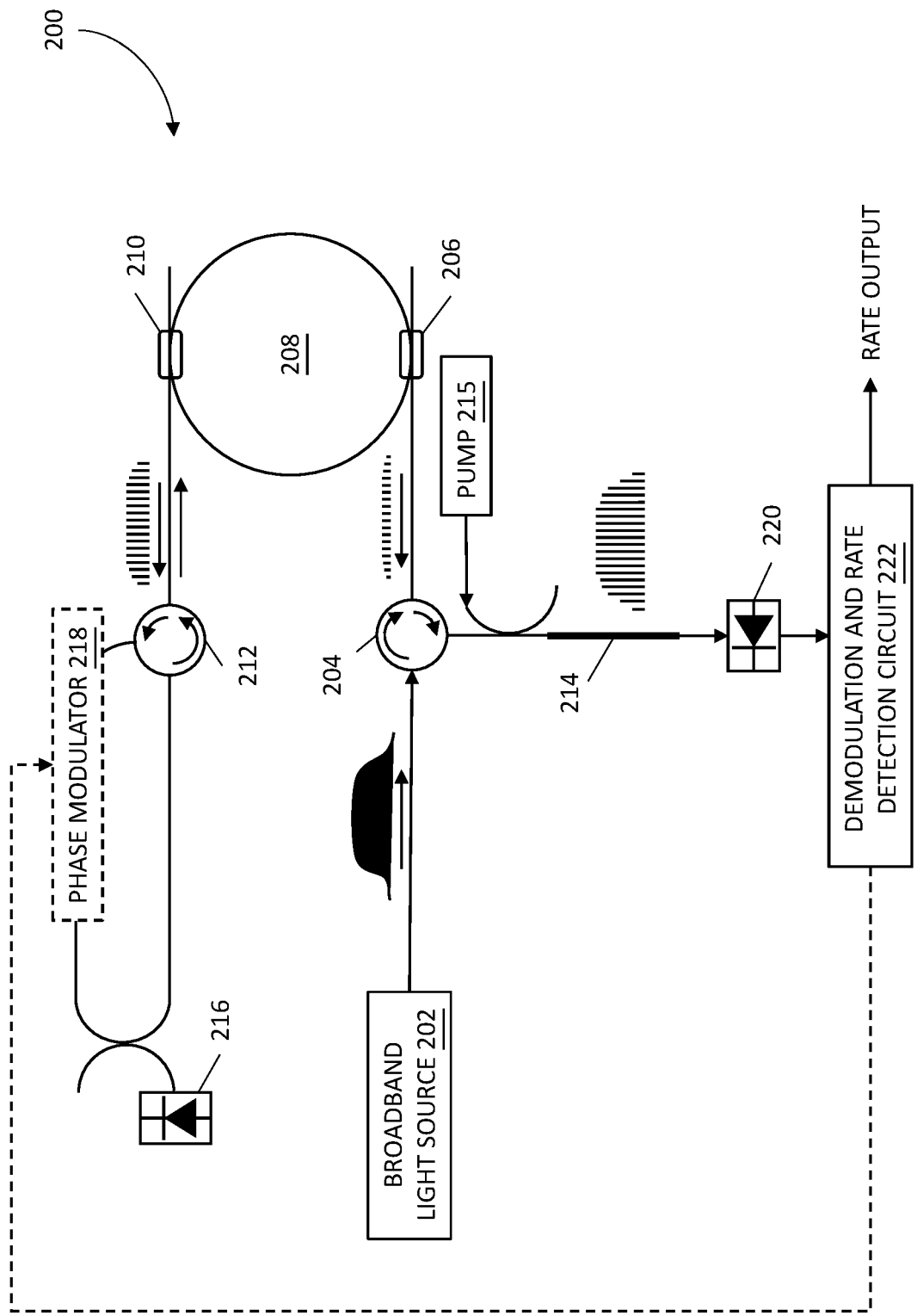
FIG. 2 is a block diagram of an example optical gyroscope.

FIG. 2 is a block diagram of another example resonator optical gyroscope 200 in which the techniques for efficient optical power management for low shot noise can be implemented. In the example shown in FIG. 2, the resonator optical gyroscope 200 includes various components, including a broadband light source 202, first circulator 204, first optical coupler 206, optical resonator 208, second optical coupler 210, second circulator 212, gain element 214, power monitor 216, phase modulator 218, photodetector 220, and a demodulation and rate detection circuit 222. Although not specifically labelled in FIG. 2, the components of the resonator optical gyroscope 200 are coupled via suitable guided optics. For example, the components of the resonator optical gyroscope 200 can be coupled via optical waveguides and/or free space optics such as lenses, mirrors, and beam splitters. The resonator optical gyroscope 200 in some examples is implemented on an integrated photonics substrate, such as a photonics chip.

The resonator optical gyroscope 200 generally operates by propagating optical signals through different optical pathways, where they are ultimately processed to determine a rotation rate experienced by the demodulation and rate detection circuit 222 of the resonator optical gyroscope 200.

The broadband light source 202 is configured to generate the optical signals with a broadband frequency range. In some examples, the broadband light source 202 is a broadband laser configured to generate optical signals via amplified spontaneous emission (ASE). In some examples, the broadband light source 202 is a rare-earth doped fiber or other waveguide light source. For example, the broadband light source 202 can be a fiber doped with rare-earth ions such as erbium, ytterbium, or the like. In such examples, the broadband light source 202 is optically pumped (for example, using 980 nm or 1480 nm pump lasers). The doped fiber absorbs the pump light and emits the optical signals in other wavelengths (for example, 1550 nm). In some examples, the broadband light source 202 can be a superluminescent laser diode, light emitting diode (LED), or the like. In any case, the optical signals generated by broadband light source 202 have a continuous broadband optical spectrum and low coherence. In some examples, the broadband light source 202 is configured to generate optical signals at a selected frequency/wavelength range or intensity that reduces the effects from the optical Kerr effect or renders such effects negligible.

In the example shown in FIG. 2, the optical signals generated by the broadband light source 202 are provided to a first circulator 204. In the example shown in FIG. 2, the first circulator 204 is a three-port device configured to output signals received at one port to another particular port. In the example shown in FIG. 2, optical signals received from the broadband light source 202 at a first port are output to a second port coupled to the first optical coupler 206. In the example shown in FIG. 2, optical signals received from the first optical coupler 206 at the second port are output to the photodetector 220 through the third port of the first circulator 204.

The first circulator 204 is configured to provide the optical signals received from the broadband light source 202 to a first optical coupler 206, and the first optical coupler 206 is configured to couple at least a portion of the optical signals into the optical resonator 208. In some examples, the fiber extending past the first optical coupler 206 is angle cleaved in order to prevent back reflection of the portion of the optical signals that are not transmitted into the optical resonator 208. In other examples, an optical isolator or a similar device could also be used to prevent back reflection. In any case, the prevention of back reflection ensures that these signals do not interfere with the other signals that are received by the photodetector 220 (including the optical signals generated by broadband light source 202 and the optical signals or phase-modulated optical signals coupled out of the optical resonator 208, as further described herein).

The optical resonator 208 is configured to pass a portion of the coupled optical signals at resonance frequencies of the optical resonator 208. When the first optical coupler 206 receives the optical signals from the first circulator 204, it directs the optical signals to propagate in a first direction in the optical resonator 208. In the example shown in FIG. 2, the optical signals coupled into the optical resonator 208 by the first optical coupler 206 propagate in the counterclockwise (CCW) direction; however, in other examples the resonator optical gyroscope 200 can be designed such that the optical signals propagate initially in the clockwise (CW) direction. As the optical signals propagate in the optical resonator 208, some frequency components of the optical signals (particularly frequency components that are not near the resonance frequency of the optical resonator 208) will interfere destructively and not resonate. Thus, the frequency components of the optical signals that correspond to the resonance frequencies of the optical resonator 208 will get transmitted to the output port (second optical coupler 210), while other frequency components will not.

After propagating through the optical resonator 208, a portion of the optical signals are coupled out of the optical resonator 208 via a second optical coupler 210. The optical filtering of the optical signals in the first passage through the optical resonator 208 reshapes the broadband optical spectrum to match the optical resonator transmission lines. As shown in FIG. 2, the optical signals coupled out of the optical resonator 208 have a significantly reduced power level and are channelized by the multiple resonances in the CCW direction.

The optical signals coupled out of the optical resonator 208 via the second optical coupler 210 are then sent to a second circulator 212. In the example shown in FIG. 2, the second circulator 212 is a three-port device configured to output signals received at one port to another particular port. In the example shown in FIG. 2, optical signals received from the second optical coupler 210 at a first port are output to a second port, and optical signals received (from the phase modulator 218 if included) at a third port are output to the first port and then the second optical coupler 210. Unlike the examples shown in FIGS. 1A-1B, the resonator optical gyroscope 200 shown in FIG. 2 does not amplify the optical signals after the first pass through the optical resonator 208.

While some of the signal is coupled into the optical resonator 208, a residual amount of signal propagates toward the fiber extending past the second optical coupler 210. In some examples, the fiber extending past the second optical coupler 210 is angle cleaved in order to prevent back reflection of the portion of the amplified optical signals that are not transmitted into the optical resonator 208. In other examples, an optical isolator or a similar device could also be used to prevent back reflection. In any case, the prevention of back reflection ensures that these signals do not interfere with the other signals that are received by the second optical coupler 210.

The second optical coupler 210 couples the optical signals in a second direction through the optical resonator 208. In the example shown in FIG. 2, the optical signals coupled back into the optical resonator 208 by the second optical coupler 210 propagate in the CW direction. The optical signals with frequency components corresponding to a resonance peak of the optical resonator 208 propagate through the optical resonator 208, while non-resonance frequency components are rejected.

After the optical signals propagate through the optical resonator 208, the first optical coupler 206 is configured to couple a portion of the optical signals out of the optical resonator 208, and the optical signals are directed to the first circulator 204. Since the optical signals are propagating in a direction towards the broadband light source 202 and received at the second port of the first circulator 204, the first circulator 204 acts as an isolator to direct the optical signals to the gain element 214 and prevent the optical signals from propagating back to the broadband light source 202.

The gain element 214 (also referred to as a "gain medium") is configured to amplify the optical signals output from the optical resonator 208. In the example shown in FIG. 2, the gain element 214 is a rare-earth doped amplifier that is optically pumped using pump laser 215. In some examples, the gain element 214 can be a fiber or waveguide doped with rare-earth ions such as erbium, ytterbium, or the like, and the pump laser 215 is a 980 nm or 1480 nm pump laser. In other examples, the gain element 214 can be a semiconductor optical amplifier that is electrically pumped in order to provide the desired level of amplification of the optical signals.

In the example shown in FIG. 2, the resonator optical gyroscope 200 includes a power monitor 216 configured to measure the power level of the optical signals after the first pass through the optical resonator 208. The amount of amplification provided by the gain element 214 to the optical signals is adjustable. In some examples, the power level of the optical signals after the first pass through the optical resonator 208 can be useful to determine the losses due to the optical resonator 208, and for adjusting the gain element 214. In some examples, the pump power used for optical pumping of the gain element 214 (for example, where the gain element 214 is an EDFA) or the amount of current used for pumping of the gain element 214 (for example, where the gain element 214 is a SOA) can be adjusted based on power measurements from the power monitor 216. In some examples, the adjustment is made using a servo or other control circuit.

Regardless of the type of gain element 214 used in the resonator optical gyroscope, in some examples, the amount of optical or electrical pumping of the gain element 214 is selected, at least in part, based on the desired total power consumption of the resonator optical gyroscope 200. For example, the power consumption of pumping the gain element 214 can be limited based on a total power consumption of the resonator optical gyroscope 200 including the power consumption for pumping of the broadband light source 202 and operation of the phase modulator 218 (if included), photodetector 220, and the demodulation and rate detection circuit 222. By using the gain element 214 to amplify the optical signals after the second pass through the optical resonator 208, the amount of power used for the broadband light source 202 (for example, pump power) can be reduced and the power level of the amplified optical signals at the photodetector 220 will still be significantly improved (for example, by orders of magnitude) even without increasing the power consumption of the resonator optical gyroscope 200 as a whole.

The amplified optical signals propagate from gain element 214 to the photodetector 220. The photodetector 220 is configured to convert the amplified optical signals from an optical signal to a corresponding electrical signal, based on the power of the received amplified optical signals. The electrical signal corresponding to the amplified optical signals is then provided to a demodulation and rate detection circuit 222.

In order to determine the rotation rate, the demodulation and rate detection circuit 222 is configured to demodulate the electrical signal and determine the resonance frequency shift based on the power of the demodulated signal corresponding to the amplified optical signal. For example, the received electrical signal can be indicative of a power difference corresponding to a change in rotation rate.

In some examples, the resonator optical gyroscope 200 further includes a phase modulator 218 coupled between the second port of the second circulator 212 and the third port of the second circulator 212. The phase modulator 218 is configured to modulate the phase of the optical signals based on a phase modulation signal that is determined by the demodulation and rate detection circuit 222. In some examples, the phase modulator 218 is configured to generate phase-modulated optical signals using a sawtooth waveform. In some examples, phase modulator 118 is an electro-optic phase modulator. Utilizing such a phase modulator simplifies the architecture of the resonator optical gyroscope 100 compared to previous designs and reduces the size and cost of implementing phase modulation and frequency shift of the optical signals.

Once modulated by phase modulator 218, the phase-modulated optical signals are sent back to the optical resonator 208 in the reverse direction through the second circulator 212 to the second optical coupler 210. After modulation, the phase-modulated optical signals are provided to the third port of the second circulator 212. The phase-modulated optical signals received at the third port of the second circulator 112 are output to the first port of the second circulator 112, which then passes the phase-modulated optical signals back to the second optical coupler 210. The second optical coupler 210 is configured to couple at least a portion of the phase-modulated optical signals into the optical resonator 208.

After the phase-modulated optical signals propagate through the optical resonator 208, the first optical coupler 206 is configured to couple a portion of the phase-modulated optical signals out of the optical resonator 208, and the phase-modulated optical signals are directed to the first circulator 204. Since the phase-modulated optical signals are propagating in a direction towards the broadband light source 202 and received at the second port of the first circulator 204, the first circulator 204 acts as an isolator to direct the phase-modulated optical signals to the gain element 214 and prevent the phase-modulated optical signals from propagating back to the broadband light source 202.

The phase-modulated optical signals propagate from first circulator 204 to the gain element 214, which amplifies the phase-modulated optical signals to generate phase-modulated, amplified optical signals. The phase-modulated, amplified optical signals are provided to the photodetector 120, which is configured to convert the phase-modulated, amplified optical signals from an optical signal to a corresponding electrical signal, based on the power of the received phase-modulated, amplified optical signals. The electrical signal corresponding to the phase-modulated, amplified optical signals is then provided to a demodulation and rate detection circuit 222.

In some examples, the power level of the phase-modulated, amplified optical signals at the photodetector 220 can also be used to adjust the slope of the phase modulation signal at the phase modulator 218, and the slope difference between two successive periods of the phase modulation signal can be used to determine the frequency shift. The demodulation and rate detection circuit 222 can then determine the rotation rate based on the frequency shift.

In some examples, the resonator optical gyroscope 200 shown in FIG. 2 is configured to operate as a closed-loop optical gyroscope because the output from the optical resonator 208, indicative of a rotation rate, is also used as feedback to adjust the operation of the phase modulator 218 (wherein the "closed-loop" comprises the propagation of signals from the phase modulator 218 to, ultimately, the demodulation and rate detection circuit 222, and the control signals input to the phase modulator 218). In some examples, the demodulation and rate detection circuit 222 includes control circuitry configured to adjust the operation of phase modulator 218 based on the electrical signal from the photodetector 220. In some examples, the demodulation and rate detection circuit 222 configures at least one parameter of the phase modulator 218, such as the characteristics of the phase modulation signal used by the phase modulator 218 to modulate the optical signals. For example, as previously described, the demodulation and rate detection circuit 222 is configured to adjust the slope(s) of a sawtooth phase modulation signal based on a power change determined from the received electrical signal. The demodulation and rate detection circuit 222 can send control signals that configure the phase modulator 218. The serrodyne modulation (sawtooth phase modulation) shifts the frequency of the returning beam and makes the frequencies overlap with the CW resonance peaks of the optical resonator 208.

In response to receiving the control signals to adjust the slope of the phase modulation signal, the phase modulator 218 generates an adjusted phase modulation signal with the slope of the waveform corresponding to the parameters set by the demodulation and rate detection circuit 222. For example, the phase-modulated optical signal can have a frequency shift that corresponds to the shifted resonance frequency of the optical resonator 108 due to rotation. In this way, the resonator optical gyroscope 200 (and in particular the demodulation and rate detection circuit 222) can compensate for power changes (for example, rotation-induced changes) in the average power of phase-modulated, amplified optical signals that are detected by the demodulation and rate detection circuit 222.

In some examples, to reduce the rate measurement error, the optical resonator 208 can include polarizers (not shown) configured to filter out portions of the optical signals that correspond to undesirable polarization states. For example, the optical resonator 208 can include a polarizer (not shown) configured to filter out portions of the optical signals that correspond to unwanted polarization modes of the optical resonator 208. As a result, only the portion of the optical signals that correspond to a selected polarization mode of the optical resonator 208 are allowed to pass through the polarizer, and will get transmitted through each round trip through the optical resonator 208.

While not explicitly shown, in some examples, the pump laser 215 shown in FIG. 2 can be shared by the broadband light source 202 and/or the gain element 214 in a manner similar to that described above with respect to FIG. 1B. In such examples, the pump power used for optical pumping of the gain element 214 and/or the split ratio implemented by the coupler (not shown) that splits the shared pump laser 215 can be adjusted based on power measurements from the power monitor 216. In some examples, the adjustment is made using a servo or other control circuit.

Further, it should be understood that a resonator optical gyroscope 100, 150, 200 can include multiple gain elements 114, 214 in some implementations of the resonator optical gyroscopes 100, 150, 200. For example, a resonator optical gyroscope can include a first gain element (such as gain element 114) configured to amplify optical signals after the optical signals pass through the optical resonator in the first direction and prior to the optical signals being coupled into the optical resonator to propagate in the second direction, and the resonator optical gyroscope can include a second gain element (such as gain element 214) configured to amplify optical signals after the optical signals pass through the optical resonator in the second direction.

Figure 3:
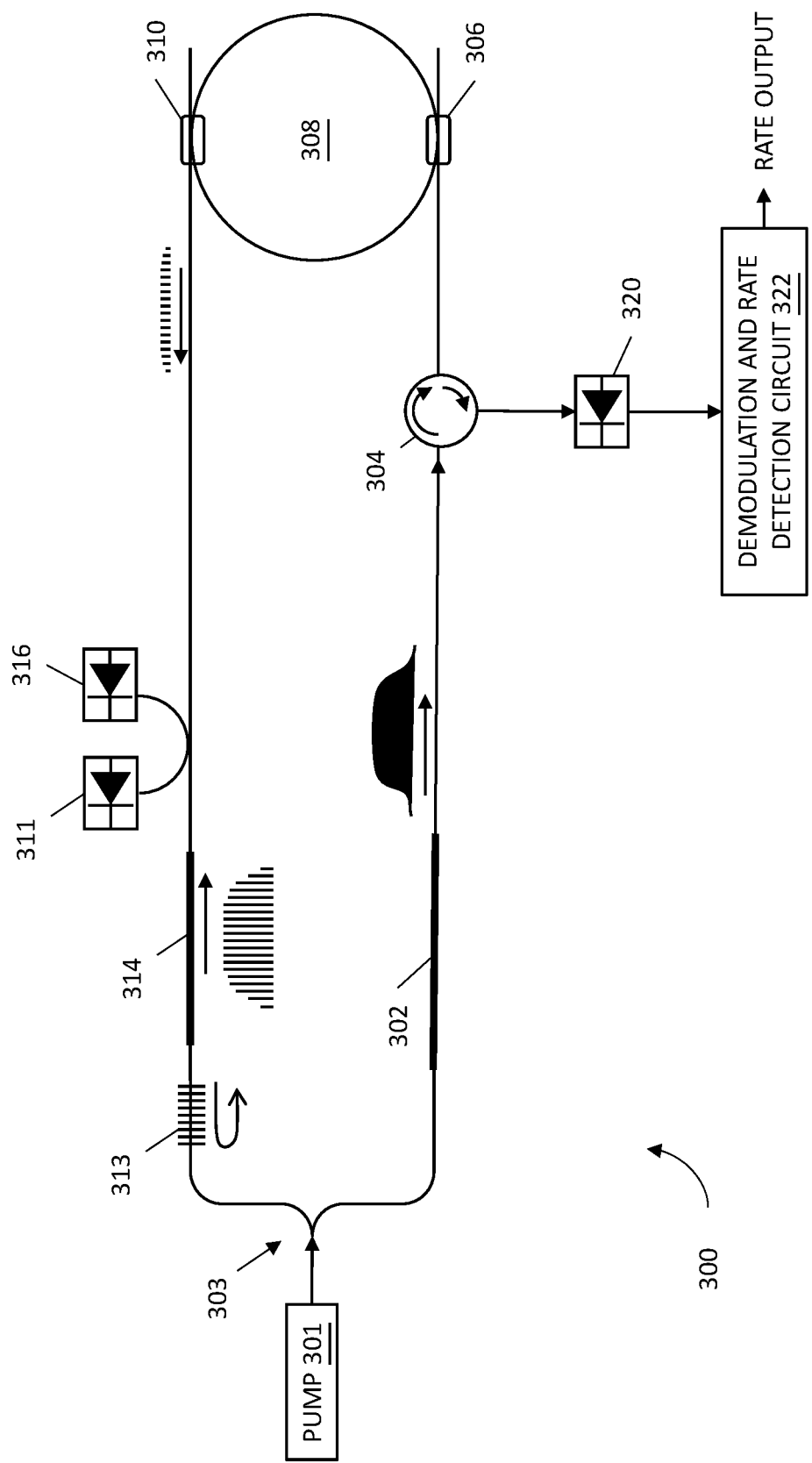
FIG. 3 is a block diagram of an example optical gyroscope.

FIG. 3 illustrates a block diagram of an example resonator optical gyroscope 300 in which the techniques for efficient optical power management for low shot noise can be implemented. In the example shown in FIG. 3, the resonator optical gyroscope 300 includes various components, including a broadband light source 302, first optical coupler 306, optical resonator 308, second optical coupler 310, gain element 314, power monitors 311, 316, fiber Bragg grating 313, rate photodetector 320, and a demodulation and rate detection circuit 322. Although not specifically labelled in FIG. 3, the components of the resonator optical gyroscope 300 are coupled via suitable guided optics. For example, the components of the resonator optical gyroscope 300 can be coupled via optical waveguides and/or free space optics such as lenses, mirrors, and beam splitters. The resonator optical gyroscope 300 in some examples is implemented on an integrated photonics substrate, such as a photonics chip.

The resonator optical gyroscope 300 generally operates by propagating optical signals through different optical pathways, where they are ultimately processed to determine a rotation rate experienced by the demodulation and rate detection circuit 322 of the resonator optical gyroscope 300.

The broadband light source 302 is configured to generate the optical signals with a broadband frequency range. In some examples, the broadband light source 302 is a broadband laser configured to generate optical signals via amplified spontaneous emission (ASE). In the example shown in FIG. 3, the broadband light source 302 is a rare-earth doped fiber or other waveguide light source, and the broadband light source 302 is optically pumped using the pump laser 301. In some examples, the broadband light source 302 can be a fiber doped with rare-earth ions such as erbium, ytterbium, or the like, and the pump laser 301 is a 980 nm or 1480 nm pump laser. In any case, the optical signals generated by broadband light source 302 have a continuous broadband optical spectrum and low coherence. In some examples, the broadband light source 302 is configured to generate optical signals at a selected frequency/wavelength range or intensity that reduces the effects from the optical Kerr effect or renders such effects negligible.

In the example shown in FIG. 3, the optical signals generated by the broadband light source 302 are provided to a circulator 304. In the example shown in FIG. 3, the circulator 304 is a three-port device configured to output signals received at one port to another particular port. In the example shown in FIG. 3, optical signals received from the broadband light source 302 at a first port are output to a second port coupled to the first optical coupler 306. In the example shown in FIG. 3, optical signals received from the first optical coupler 306 at the second port are output to a third port connected to the photodetector 320.

The circulator 304 is configured to provide the optical signals received from the broadband light source 302 to a first optical coupler 306, and the first optical coupler 306 is configured to couple at least a portion of the optical signals into the optical resonator 308. In some examples, the fiber extending past the first optical coupler 306 is angle cleaved in order to prevent back reflection of the portion of the optical signals that are not transmitted into the optical resonator 308. In other examples, an optical isolator or a similar device could also be used to prevent back reflection. In any case, the prevention of back reflection ensures that these signals do not interfere with the other signals that are received by the first optical coupler 306 (including the optical signals generated by broadband light source 302 and the amplified optical signals, as further described herein).

The optical resonator 308 is configured to pass a portion of the coupled optical signals at one or more resonance frequencies of the optical resonator 308. When the first optical coupler 306 receives the optical signals from the broadband light source 302, it directs the optical signals to propagate in a first direction in the optical resonator 308. In the example shown in FIG. 3, the optical signals coupled into the optical resonator 308 by the first optical coupler 306 propagate in the counterclockwise (CCW) direction; however, in other examples the resonator optical gyroscope 300 can be designed such that the optical signals propagate initially in the clockwise (CW) direction. As the optical signals propagate in the optical resonator 308, some frequency components of the optical signals (particularly frequency components that are not near the resonance frequency of the optical resonator 308) will interfere destructively and not resonate. Thus, the frequency components of the optical signals that correspond to the resonance frequencies of the optical resonator 308 will get transmitted to the output port (second optical coupler 310), while other frequency components will not.

After propagating through the optical resonator 308, a portion of the optical signals are coupled out of the optical resonator 308 via a second optical coupler 310. The optical filtering of the optical signals in the first passage through the optical resonator 308 reshapes the broadband optical spectrum to match the optical resonator transmission lines. As shown in FIG. 3, the optical signals coupled out of the optical resonator 308 have a significantly reduced power level and are channelized by the multiple resonances in the CCW direction.

The optical signals coupled out of the optical resonator 308 via the second optical coupler 310 are then provided to an optical path that includes the fiber Bragg grating 313 and the gain element 314. In the example shown in FIG. 3, the pump laser 301 is configured to optically pump both the broadband light source 302 and the gain element 314. In some examples, the pump laser 103 is a 980 nm or 1480 nm pump laser. In the example shown in FIG. 3, a splitter 303 is used to couple pump power to the broadband light source 302 and the gain element 314 into different desired configurations. For example, the splitter 303 can be configured to implement a 50/50 split of the pump power such that 50% of the pump power is provided to the broadband light source 302 and 50% of the pump power is provided to the gain element 314. It should be understood that other ratios can be implemented by the splitter 303 as well depending on desired performance and design constraints.

In the example shown in FIG. 3, the gain element 314 is optically pumped in a single direction and provides amplification in the single direction. In the example shown in FIG. 3, the optical signals propagate to the fiber Bragg grating 313 and are back reflected. In some examples, the fiber Bragg grating 313 could also be waveguide reflectors (for example, gratings on the waveguide). After the optical signals are back reflected and propagating in the reverse direction, the gain element 314 is configured to amplify the optical signals. In the example shown in FIG. 3, the gain element 314 is a rare-earth doped amplifier. For example, the gain element 314 can be a fiber or waveguide doped with rare-earth ions such as erbium, ytterbium, or the like. In such examples, the gain element 314 is optically pumped (for example, using a 980 nm or 1480 nm pump laser) in order to provide a desired level of amplification to the optical signals propagating in a particular direction. In other examples, the gain element 314 is a semiconductor optical amplifier. In such examples, the gain element 314 is electrically pumped in order to provide the desired level of amplification of the optical signals.

In the example shown in FIG. 3, the resonator optical gyroscope 300 includes multiple power monitors 311, 316 configured to measure the power level of the amplified optical signals, and the amount of amplification provided by the gain element 314 to the optical signals is adjustable. In some examples, it is desirable to produce amplified optical signals at a particular power level during calibration and/or maintain an approximately constant output power using the gain element 314 during operation. In some examples, the pump power used for optical pumping of the gain element 314 (for example, where the gain element 314 is an EDFA) and/or the split ratio implemented by the splitter 303 can be adjusted based on power measurements from the power monitors 311, 316. In some examples, the adjustment is made using a servo or other control circuit.

Regardless of the type of gain element 314 used in the resonator optical gyroscope, in some examples, the amount of optical or electrical pumping of the gain element 314 is selected, at least in part, based on the desired total power consumption of the resonator optical gyroscope. For example, the power consumption of pumping the gain element 314 can be limited based on a total power consumption of the resonator optical gyroscope 300 including the power consumption for pumping of the broadband light source 302 and operation of the photodetector 320 and the demodulation and rate detection circuit 322. By using the gain element 314 to amplify the optical signals after a first pass through the optical resonator 308, the amount of power used for the broadband light source 302 (for example, pump power) can be reduced and the power level of the amplified optical signals at the photodetector 320 will be significantly improved (for example, by orders of magnitude) even without increasing the total power consumption of the resonator optical gyroscope 300 as a whole.

The amplified optical signals are provided to the second optical coupler 310. The second optical coupler 310 is configured to couple at least a portion of the amplified optical signals into the optical resonator 308. While some of the signal is coupled into the optical resonator 308, a residual amount of signal propagates toward the fiber extending past the second optical coupler 310. In some examples, the fiber extending past the second optical coupler 310 is angle cleaved in order to prevent back reflection of the portion of the amplified optical signals that are not transmitted into the optical resonator 308. In other examples, an optical isolator or a similar device could also be used to prevent back reflection. In any case, the prevention of back reflection ensures that these signals do not interfere with the other signals that are received by the second optical coupler 310.

The second optical coupler 310 couples the amplified optical signals in a second direction through the optical resonator 308. In the example shown in FIG. 3, the amplified optical signals propagate in the CW direction. The amplified optical signals with frequency components corresponding to a resonance peak of the optical resonator 308 propagate through the optical resonator 308, while non-resonance frequency components are rejected.

After the amplified optical signals propagate through the optical resonator 308, the first optical coupler 306 is configured to couple a portion of the amplified optical signals out of the optical resonator 308, and the amplified optical signals are directed to the circulator 304. Since the amplified optical signals are propagating in a direction towards the broadband light source 302 and received at the second port of the circulator 304, the circulator 304 acts as an isolator to direct the amplified optical signals to the photodetector 320 and prevent the amplified optical signals from propagating back to the broadband light source 302.

The amplified optical signals propagate from circulator 304 to the photodetector 320. The photodetector 320 is configured to convert the amplified optical signals from an optical signal to a corresponding electrical signal, based on the power of the received amplified optical signals. The electrical signal corresponding to the amplified optical signals is then provided to a demodulation and rate detection circuit 322.

In order to determine the rotation rate, the demodulation and rate detection circuit 322 is configured to demodulate the electrical signal and determine the resonance frequency shift based on the power of the demodulated signal corresponding to the amplified optical signal. For example, the received electrical signal can be indicative of a power difference corresponding to a change in rotation rate.

In some examples, to reduce the rate measurement error, the optical resonator 308 can include polarizers (not shown) configured to filter out portions of the optical signals that correspond to undesirable polarization states. For example, the optical resonator 308 can include a polarizer (not shown) configured to filter out portions of the optical signals that correspond to unwanted polarization modes of the optical resonator 308. As a result, only the portion of the optical signals that correspond to a selected polarization mode of the optical resonator 308 are allowed to pass through the polarizer, and will get transmitted through each round trip through the optical resonator 308.

Further, it should be understood that a resonator optical gyroscope can include a second gain element in some implementations of the resonator optical gyroscope 300. For example, the resonator optical gyroscope 300 can include a second gain element (similar to gain element 214) configured to amplify optical signals after the optical signals pass through the optical resonator in the second direction.

Figure 4:
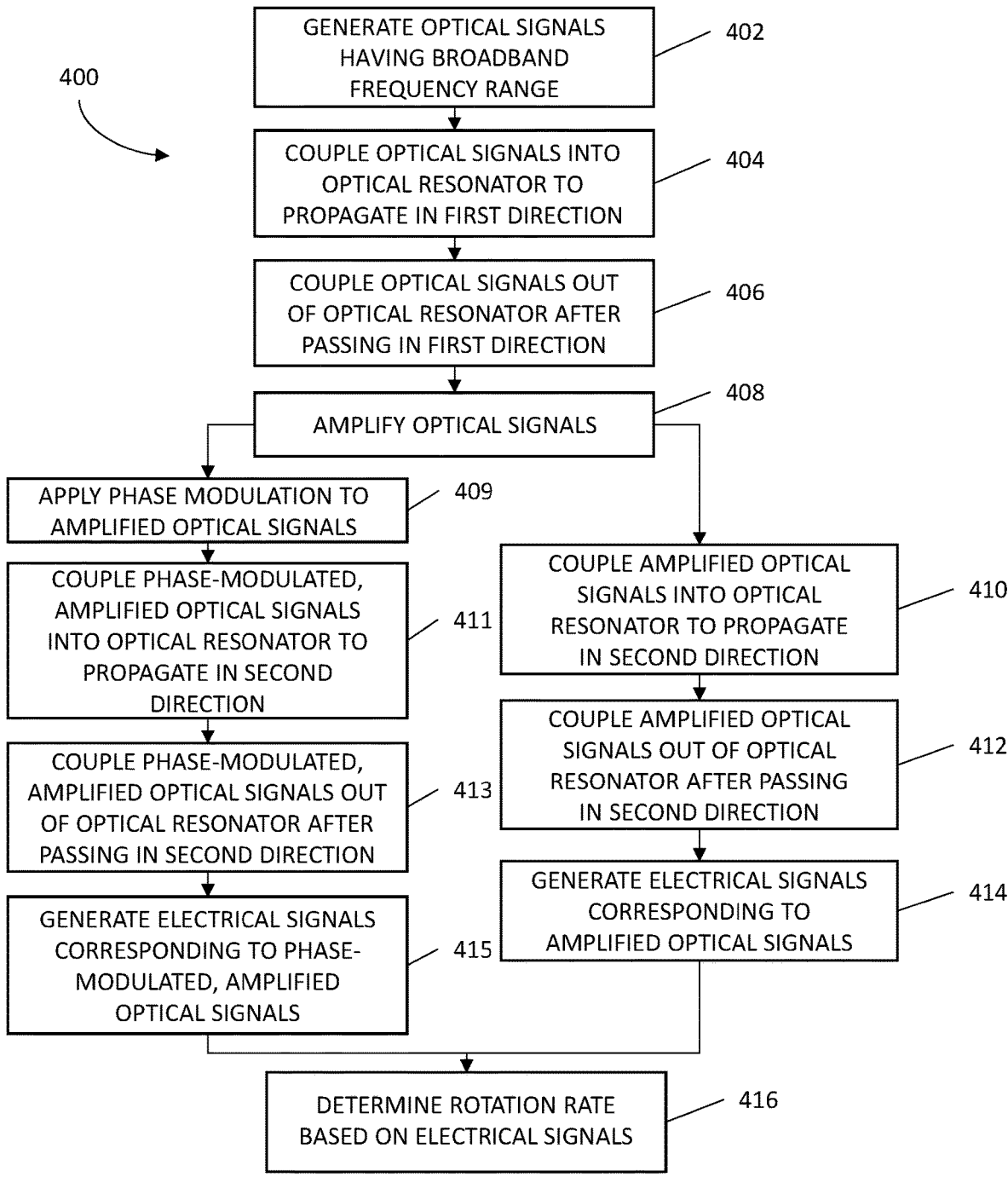
FIG. 4 is a flow diagram of an example method for operating an optical gyroscope.

FIG. 4 illustrates a flow diagram of an example method 400 of operation of a resonator optical gyroscope. The common features discussed above with respect to the example system in FIGS. 1A-3 can include similar characteristics to those discussed with respect to method 400 and vice versa. In some examples, the blocks of the method 400 are performed by resonator optical gyroscopes 100, 150, 300 described above.

The method 400 includes generating optical signals having a broadband frequency range (block 402). In some examples, the optical signals are generated using a broadband light source, which can be an ASE laser, rare-earth doped fiber, superluminescent laser diode, a light emitting diode, or the like.

The method 400 further includes coupling the optical signals into an optical resonator to propagate in a first direction (block 404), and coupling the optical signals out of the optical resonator after the optical signals pass through the optical resonator in the first direction (block 406). In some examples, the optical signals are coupled into the optical resonator and out of the optical resonator using a first optical coupler and a second optical coupler, respectively.

The method 400 further includes amplifying the optical signals coupled out of the optical resonator after the optical signals pass through the optical resonator in the first direction (block 408). In some examples, amplifying the optical signals is performed using a gain element, which can be a rare-earth doped amplifier, semiconductor optical amplifier, or the like. In some examples, the gain element is optically or electrically pumped, and the amount of pump power is determined, at least in part, based on the desired total power consumption for the resonator optical gyroscope.

In some examples, phase modulation is not applied to the amplified optical signals. In such examples, the method 400 proceeds with coupling the amplified optical signals into an optical resonator to propagate in a second direction (block 410), and coupling the amplified optical signals out of the optical resonator after the optical signals pass through the optical resonator in the second direction (block 412). In some examples, the optical signals are coupled into the optical resonator and out of the optical resonator using the second optical coupler and the first optical coupler, respectively.

In examples where phase modulation is not applied to the amplified optical signals, method 400 further includes generating electrical signals corresponding to the amplified optical signals (block 414). In some examples, the electrical signals are generated by a photodetector based on a power level of the phase-modulated, amplified optical signals.

In other examples, the method 400 further includes applying a phase modulation to the amplified optical signals (block 409). In some examples, applying a phase modulation to the amplified optical signals includes using a sawtooth waveform.

In examples where phase modulation is applied to the amplified optical signals, the method 400 further includes coupling the phase-modulated, amplified optical signals into an optical resonator to propagate in a second direction (block 411), and coupling the phase-modulated, amplified optical signals out of the optical resonator after the optical signals pass through the optical resonator in the second direction (block 413). In some examples, the optical signals are coupled into the optical resonator and out of the optical resonator using the second optical coupler and the first optical coupler, respectively.

In examples where phase modulation is applied to the amplified optical signals, method 400 further includes generating electrical signals corresponding to the phase-modulated, amplified optical signals (block 415). In some examples, the electrical signals are generated by a photodetector based on a power level of the phase-modulated, amplified optical signals.

Whether phase modulation is applied to the amplified optical signals or not, the method 400 further includes determining a rotation rate based on the electrical signals (block 416). In some examples, determining the rotation rate includes demodulating the electrical signals and determining a resonance frequency shift based on the power of the demodulated electrical signal corresponding to the amplified optical signals or phase-modulated, amplified optical signals depending on the circumstances.

In some examples, phase modulation (block 409) can be performed prior amplification (block 408). In such examples, the phase modulation is applied to the optical signals coupled out of the optical resonator after the optical signals pass through the optical resonator in the first direction, and the phase-modulated optical signals are amplified.

Figure 5:
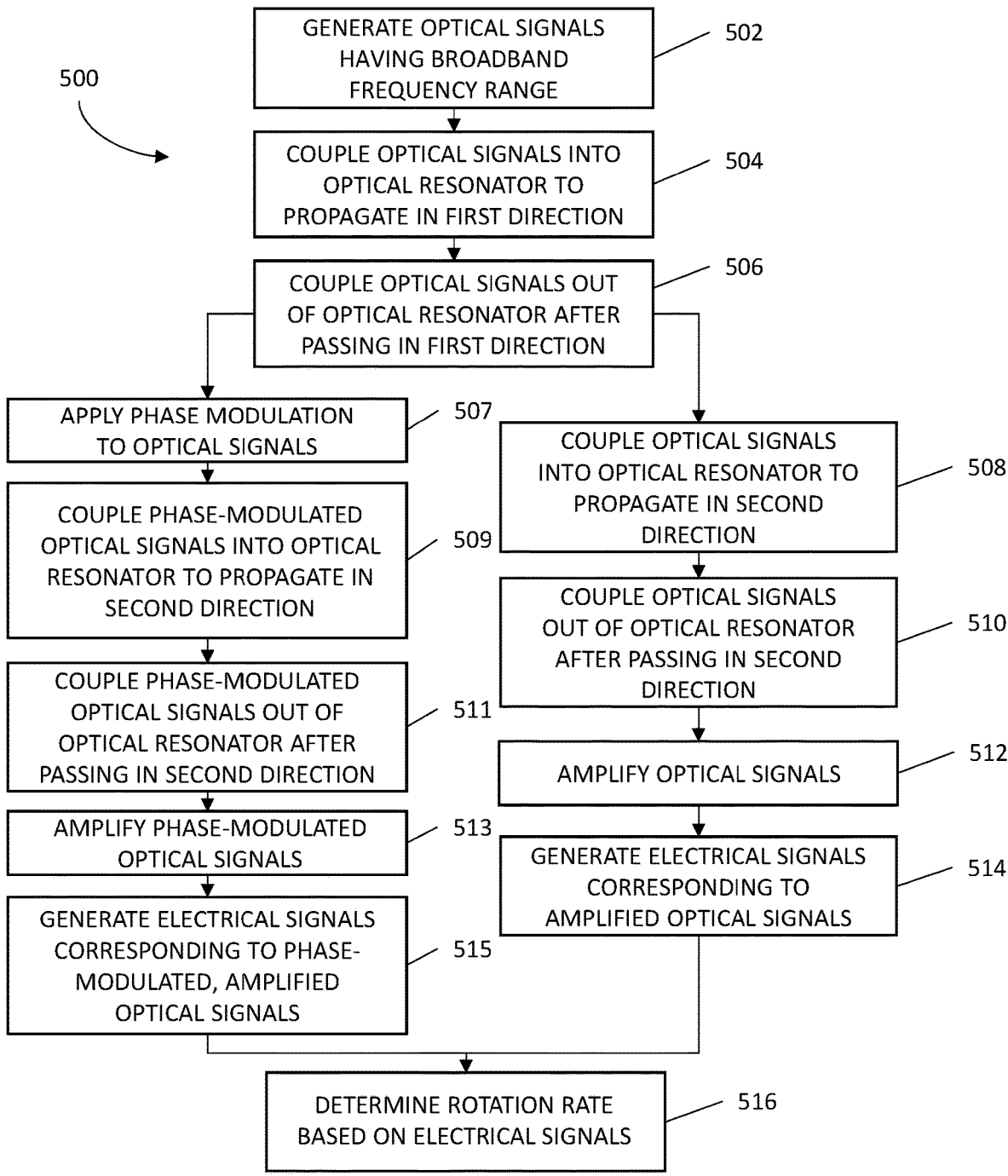
FIG. 5 is a flow diagram of an example method for operating an optical gyroscope.

FIG. 5 illustrates a flow diagram of an example method 500 of operation of a resonator optical gyroscope. The common features discussed above with respect to the example system in FIGS. 1A-3 can include similar characteristics to those discussed with respect to method 500 and vice versa. In some examples, the blocks of the method 500 are performed by resonator optical gyroscope 200 described above.

The method 500 includes generating optical signals having a broadband frequency range (block 502). In some examples, the optical signals are generated using a broadband light source, which can be an ASE laser, rare-earth doped fiber, superluminescent laser diode, a light emitting diode, or the like.

The method 500 further includes coupling the optical signals into an optical resonator to propagate in a first direction (block 504), and coupling the optical signals out of the optical resonator after the optical signals pass through the optical resonator in the first direction (block 506). In some examples, the optical signals are coupled into the optical resonator and out of the optical resonator using a first optical coupler and a second optical coupler, respectively.

In some examples, phase modulation is not applied to the optical signals. In such examples, the method 500 proceeds with coupling the optical signals into an optical resonator to propagate in a second direction (block 508), and coupling the optical signals out of the optical resonator after the optical signals pass through the optical resonator in the second direction (block 510). In some examples, the optical signals are coupled into the optical resonator and out of the optical resonator using the second optical coupler and the first optical coupler, respectively.

In examples where phase modulation is not applied to the amplified optical signals, the method 500 further includes amplifying the optical signals coupled out of the optical resonator after the optical signals pass through the optical resonator in the second direction (block 512). In some examples, amplifying the optical signals is performed using a gain element, which can be a rare-earth doped amplifier, semiconductor optical amplifier, or the like. In some examples, the gain element is optically or electrically pumped, and the amount of pump power is determined, at least in part, based on the desired total power consumption for the resonator optical gyroscope.

In examples where phase modulation is not applied to the amplified optical signals, method 500 further includes generating electrical signals corresponding to the amplified optical signals (block 514). In some examples, the electrical signals are generated by a photodetector based on a power level of the phase-modulated, amplified optical signals.

In other examples, the method 500 further includes applying a phase modulation to the amplified optical signals (block 507). In some examples, applying a phase modulation to the amplified optical signals includes using a sawtooth waveform.

In examples where phase modulation is applied to the amplified optical signals, the method 500 further includes coupling the phase-modulated optical signals into an optical resonator to propagate in a second direction (block 509), and coupling the phase-modulated optical signals out of the optical resonator after the optical signals pass through the optical resonator in the second direction (block 511). In some examples, the optical signals are coupled into the optical resonator and out of the optical resonator using the second optical coupler and the first optical coupler, respectively.

In examples where phase modulation is applied to the amplified optical signals, the method 500 further includes amplifying the phase-modulated optical signals coupled out of the optical resonator after the phase-modulated optical signals pass through the optical resonator in the second direction (block 513). In some examples, amplifying the phased-modulated optical signals is performed using a gain element, which can be a rare-earth doped amplifier, semiconductor optical amplifier, or the like. In some examples, the gain element is optically or electrically pumped, and the amount of pump power is determined, at least in part, based on the desired total power consumption for the resonator optical gyroscope.

In examples where phase modulation is applied to the amplified optical signals, the method 500 further includes generating electrical signals corresponding to the phase-modulated, amplified optical signals (block 515). In some examples, the electrical signals are generated by a photodetector based on a power level of the phase-modulated, amplified optical signals.

Whether phase modulation is applied to the amplified optical signals or not, the method 500 further includes determining a rotation rate based on the electrical signals (block 516). In some examples, determining the rotation rate includes demodulating the electrical signals and determining a resonance frequency shift based on the power of the demodulated electrical signal corresponding to the amplified optical signals or phase-modulated, amplified optical signals depending on the circumstances.

By using strategically placed gain element(s) as described herein, several advantages are achieved over currently available resonator optical gyroscopes utilizing a broadband light source. The power levels of the optical signals received at the photodetector for the resonator optical gyroscopes described herein are orders of magnitude higher compared to other systems. This ensures that the power level of the optical signals at the detector is high enough to reduce the shot noise level, and the increase in power levels can be achieved without increasing the overall power consumption for the resonator optical gyroscope. Moreover, when using phase modulators and/or polarizers in combination with the gain element(s) as described herein, the power levels of the optical signals can be further improved and error on the rotation rate measurements is reduced.

In various aspects, system elements, method steps, or examples described throughout this disclosure (such as the demodulation and rate detection circuit 122, or components thereof, for example) may be implemented on one or more computer systems including a central processing unit (CPU), graphics processing unit (GPU), field programmable gate array (FPGA), application specific integrated circuit (ASIC) and/or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented, in part, in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a resonator optical gyroscope, comprising: a broadband light source configured to generate optical signals having a broadband frequency range; an optical resonator; a first optical coupler coupled to the optical resonator, wherein the first optical coupler is configured to receive the optical signals from the broadband light source and couple the optical signals into the optical resonator such that the optical signals propagate in a first direction through the optical resonator, wherein the first optical coupler is also configured to couple optical signals out of the optical resonator after the optical signals pass through the optical resonator in a second direction; a second optical coupler coupled to the optical resonator, wherein the second optical coupler is configured to couple optical signals out of the optical resonator after the optical signals pass through the optical resonator in the first direction, wherein the first optical coupler is also configured to couple optical signals into the optical resonator such that the optical signals propagate in the second direction through the optical resonator; a gain element configured to amplify optical signals that have been coupled out of the optical resonator and passed through the optical resonator in the first direction to generate amplified optical signals; a photodetector configured to convert the amplified optical signals from to corresponding electrical signals based on a power level of the amplified optical signals; and one or more circuits configured to determine a rate of rotation based on the corresponding electrical signals.

Example 2 includes the resonator optical gyroscope of Example 1, wherein the gain element is configured to receive optical signals coupled out of the optical resonator by the second optical coupler and to amplify the optical signals coupled out of the optical resonator by the second optical coupler to generate amplified optical signals; wherein the second optical coupler is configured to couple the amplified optical signals into the optical resonator such that the amplified optical signals propagate in the second direction through the optical resonator; wherein the first optical coupler is also configured to couple the amplified optical signals out of the optical resonator after the amplified optical signals pass through the optical resonator in the second direction.

Example 3 includes the resonator optical gyroscope of Example 1, wherein the gain element is configured to: receive optical signals coupled out of the optical resonator by the first optical coupler; amplify the optical signals coupled out of the optical resonator by the first optical coupler to generate amplified optical signals; and output the amplified optical signals to the photodetector.

Example 4 includes the resonator optical gyroscope of any of Examples 1-3, further comprising a first pump laser configured to optically pump the gain element and the broadband light source.

Example 5 includes the resonator optical gyroscope of any of Examples 1-4, further comprising: at least one power monitor configured to measure a power level of optical signals; and at least one control circuit configured to adjust the gain element based on the measured power level of the optical signals.

Example 6 includes the resonator optical gyroscope of any of Examples 1-5, further comprising: a first circulator coupled between the broadband light source and the first optical coupler, wherein the first circulator is configured to provide optical signals from the broadband light source to the first optical coupler and to provide optical signals from the first optical coupler to the gain element or the photodetector; and/or a second circulator coupled to the second optical coupler, wherein the second circulator is configured to provide optical signals from the second optical coupler to the gain element or a phase modulator.

Example 7 includes the resonator optical gyroscope of any of Examples 1-6, further comprising a fiber reflector or waveguide reflector configured to back reflect optical signals toward the gain element or a phase modulator.

Example 8 includes the resonator optical gyroscope of any of Examples 1-6, further comprising a phase modulator configured to apply a phase modulation to optical signals that have been coupled out of the optical resonator by the second optical coupler and passed through the optical resonator in the first direction.

Example 9 includes a resonator optical gyroscope, comprising: a broadband light source configured to generate optical signals having a broadband frequency range; an optical resonator; a first optical coupler coupled to the optical resonator, wherein the first optical coupler is configured to receive the optical signals from the broadband light source and couple the optical signals into the optical resonator such that the optical signals propagate in a first direction through the optical resonator, wherein the first optical coupler is also configured to couple optical signals out of the optical resonator after the optical signals pass through the optical resonator in a second direction; a second optical coupler coupled to the optical resonator, wherein the second optical coupler is configured to couple optical signals out of the optical resonator after the optical signals pass through the optical resonator in the first direction, wherein the first optical coupler is also configured to couple optical signals into the optical resonator such that the optical signals propagate in the second direction through the optical resonator; one or more gain elements configured to amplify optical signals that have been coupled out of the optical resonator by the second optical coupler and passed through the optical resonator in the first direction and/or optical signals that have been coupled out of the optical resonator by the first optical coupler and passed through the optical resonator in the second direction; a photodetector configured to convert amplified optical signals to corresponding electrical signals based on a power level of the amplified optical signals; and one or more circuits configured to determine a rate of rotation based on the corresponding electrical signals.

Example 10 includes the resonator optical gyroscope of Example 9, further comprising a phase modulator; wherein the one or more gain elements include a first gain element configured to receive optical signals coupled out of the optical resonator by the second optical coupler and to amplify the optical signals coupled out of the optical resonator by the second optical coupler to generate amplified optical signals; wherein the phase modulator is configured to receive the amplified optical signals from the first gain element and apply a phase modulation to the amplified optical signals to generate phase-modulated, amplified optical signals; wherein the second optical coupler is configured to couple the phase-modulated, amplified optical signals into the optical resonator such that the phase-modulated, amplified optical signals propagate in the second direction through the optical resonator; wherein the first optical coupler is configured to couple the phase-modulated, amplified optical signals out of the optical resonator after the phase-modulated, amplified optical signals pass through the optical resonator in the second direction.

Example 11 includes the resonator optical gyroscope of Example 10, wherein the one or more gain elements include a second gain element configured to receive the phase-modulated, amplified optical signals coupled out of the optical resonator by the first optical coupler and to further amplify the phase-modulated, amplified optical signals.

Example 12 includes the resonator optical gyroscope of Example 9, further comprising a phase modulator, wherein the phase modulator is configured to receive optical signals coupled out of the optical resonator by the second optical coupler and apply a phase modulation to the optical signals to generate phase-modulated optical signals; wherein the second optical coupler is configured to couple the phase-modulated optical signals into the optical resonator such that the phase-modulated optical signals propagate in the second direction through the optical resonator; wherein the first optical coupler is configured to couple the phase-modulated optical signals out of the optical resonator after the phase-modulated optical signals pass through the optical resonator in the second direction; wherein the one or more gain elements include a first gain element configured to receive the phase-modulated optical signals coupled out of the optical resonator by the first optical coupler and to amplify the phase-modulated optical signals to generate phase-modulated, amplified optical signals.

Example 13 includes the resonator optical gyroscope of Example 9, further comprising a phase modulator, wherein the phase modulator is configured to receive optical signals coupled out of the optical resonator by the second optical coupler and apply a phase modulation to the optical signals to generate phase-modulated optical signals; wherein the one or more gain elements include a first gain element configured to receive the phase-modulated optical signals from the phase modulator and to amplify the phase-modulated optical signals to generate phase-modulated, amplified optical signals; wherein the second optical coupler is configured to couple the phase-modulated, amplified optical signals into the optical resonator such that the phase-modulated, amplified optical signals propagate in the second direction through the optical resonator; wherein the first optical coupler is configured to couple the phase-modulated, amplified optical signals out of the optical resonator after the phase-modulated, amplified optical signals pass through the optical resonator in the second direction.

Example 14 includes the resonator optical gyroscope of any of Examples 9-13, further comprising one or more pump lasers configured to optically pump the broadband light source and the one or more gain elements.

Example 15 includes the resonator optical gyroscope of any of Examples 9-14, further comprising: at least one power monitor configured to measure a power level of optical signals; and at least one control circuit configured to adjust the one or more gain elements based on the measured power level of the optical signals.

Example 16 includes a method of operating a resonator optical gyroscope, comprising: generating, with a broadband light source, optical signals having a broadband frequency range; coupling, with a first optical coupler, the optical signals into an optical resonator to propagate in a first direction; coupling, with a second optical coupler, the optical signals out of the optical resonator after the optical signals pass through the optical resonator in the first direction; coupling, with the second optical coupler, optical signals into the optical resonator to propagate in a second direction; coupling, with the first optical coupler, optical signals out of the optical resonator after the optical signals pass through the optical resonator in the second direction; amplifying, with one or more gain elements, the optical signals coupled out of the optical resonator by the second optical coupler or the optical signals coupled out of the optical resonator by the first optical coupler to generate amplified optical signals; generating, with a photodetector, electrical signals corresponding to the amplified optical signals; and determining a rotation rate based on the electrical signals.

Example 17 includes the method of Example 16, wherein amplifying the optical signals coupled out of the optical resonator by the second optical coupler or the optical signals coupled out of the optical resonator by the first optical coupler to generate amplified optical signals includes amplifying the optical signals coupled out of the optical resonator by the second optical coupler; wherein the optical signals coupled into the optical resonator to propagate in the second direction with the second optical coupler are amplified optical signals; wherein the optical signals coupled out of the optical resonator with the first optical coupler are the amplified optical signals.

Example 18 includes the method of any of Examples 16-17, wherein amplifying the optical signals coupled out of the optical resonator by the second optical coupler or the optical signals coupled out of the optical resonator by the first optical coupler to generate amplified optical signals includes amplifying the optical signals coupled out of the optical resonator by the first optical coupler.

Example 19 includes the method of any of Examples 16-18, further comprising applying a phase modulation to the optical signals coupled out of the optical resonator by the second optical coupler.

Example 20 includes the method of any of Examples 16-19, further comprising optically pumping the broadband light source and the one or more gain elements using a single pump laser.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator optical gyroscope, comprising:
    a broadband light source configured to generate optical signals having a broadband frequency range;
    an optical resonator;
    a first optical coupler coupled to the optical resonator, wherein the first optical coupler is configured to receive the optical signals from the broadband light source and couple the optical signals into the optical resonator such that the optical signals propagate in a first direction through the optical resonator, wherein the first optical coupler is also configured to couple amplified optical signals out of the optical resonator after the amplified optical signals pass through the optical resonator in a second direction;
    a second optical coupler coupled to the optical resonator, wherein the second optical coupler is configured to couple the optical signals out of the optical resonator after the optical signals pass through the optical resonator in the first direction, wherein the second optical coupler is also configured to couple the amplified optical signals into the optical resonator such that the optical signals propagate in the second direction through the optical resonator;
    a gain element configured to receive the optical signals coupled out of the optical resonator by the second optical coupler and to amplify the optical signals that have been coupled out of the optical resonator by the second optical coupler and passed through the optical resonator in the first direction to generate the amplified optical signals;
    a photodetector configured to convert the amplified optical signals to corresponding electrical signals based on a power level of the amplified optical signals; and
    one or more circuits configured to determine a rate of rotation based on the corresponding electrical signals.

2. The resonator optical gyroscope of claim 1, further comprising a first pump laser configured to optically pump the gain element and the broadband light source.

3. The resonator optical gyroscope of claim 1, further comprising:
    at least one power monitor configured to measure the power level of the amplified optical signals; and
    at least one control circuit configured to adjust the gain element based on the measured power level of the optical signals.

4. The resonator optical gyroscope of claim 1, further comprising:
    a first circulator coupled between the broadband light source and the first optical coupler, wherein the first circulator is configured to provide the optical signals from the broadband light source to the first optical coupler and to provide the amplified optical signals from the first optical coupler to the photodetector; and/or
    a second circulator coupled to the second optical coupler, wherein the second circulator is configured to provide the optical signals from the second optical coupler to the gain element.

5. The resonator optical gyroscope of claim 1, further comprising a fiber reflector or waveguide reflector configured to back reflect the optical signals toward the gain element or a phase modulator.

6. The resonator optical gyroscope of claim 1, further comprising a phase modulator configured to apply a phase modulation to the amplified optical signals.

7. A resonator optical gyroscope, comprising:
a broadband light source configured to generate optical signals having a broadband frequency range;
an optical resonator;
a first optical coupler coupled to the optical resonator, wherein the first optical coupler is configured to receive the optical signals from the broadband light source and couple the optical signals into the optical resonator such that the optical signals propagate in a first direction through the optical resonator, wherein the first optical coupler is also configured to couple the optical signals out of the optical resonator after the optical signals pass through the optical resonator in a second direction;
a second optical coupler coupled to the optical resonator, wherein the second optical coupler is configured to couple the optical signals out of the optical resonator after the optical signals pass through the optical resonator in the first direction, wherein the second optical coupler is also configured to couple the optical signals into the optical resonator such that the optical signals propagate in the second direction through the optical resonator;
one or more gain elements configured to amplify the optical signals that have been coupled out of the optical resonator by the second optical coupler and passed through the optical resonator in the first direction and/or the optical signals that have been coupled out of the optical resonator by the first optical coupler and passed through the optical resonator in the second direction;
a photodetector configured to convert amplified optical signals to corresponding electrical signals based on a power level of the amplified optical signals;
one or more circuits configured to determine a rate of rotation based on the corresponding electrical signals;
a phase modulator; and
either:
(a) wherein the one or more gain elements include a first gain element configured to receive the optical signals coupled out of the optical resonator by the second optical coupler and to amplify the optical signals coupled out of the optical resonator by the second optical coupler to generate the amplified optical signals;
wherein the phase modulator is configured to receive the amplified optical signals from the first gain element and apply a phase modulation to the amplified optical signals to generate phase-modulated, amplified optical signals;
wherein the second optical coupler is configured to couple the phase-modulated, amplified optical signals into the optical resonator such that the phase-modulated, amplified optical signals propagate in the second direction through the optical resonator;
wherein the first optical coupler is configured to couple the phase-modulated, amplified optical signals out of the optical resonator after the phase-modulated, amplified optical signals pass through the optical resonator in the second direction;
(b) wherein the phase modulator is configured to receive the optical signals coupled out of the optical resonator by the second optical coupler and apply the phase modulation to the optical signals to generate phase-modulated optical signals;
wherein the second optical coupler is configured to couple the phase-modulated optical signals into the optical resonator such that the phase-modulated optical signals propagate in the second direction through the optical resonator;
wherein the first optical coupler is configured to couple the phase-modulated optical signals out of the optical resonator after the phase-modulated optical signals pass through the optical resonator in the second direction;
wherein the one or more gain elements include the first gain element configured to receive the phase-modulated optical signals coupled out of the optical resonator by the first optical coupler and to amplify the phase-modulated optical signals to generate the phase-modulated, amplified optical signals; or
(c) wherein the phase modulator is configured to receive the optical signals coupled out of the optical resonator by the second optical coupler and apply the phase modulation to the optical signals to generate the phase-modulated optical signals;
wherein the one or more gain elements include a first gain element configured to receive the phase-modulated optical signals from the phase modulator and to amplify the phase-modulated optical signals to generate the phase-modulated, amplified optical signals;
wherein the second optical coupler is configured to couple the phase-modulated, amplified optical signals into the optical resonator such that the phase-modulated, amplified optical signals propagate in the second direction through the optical resonator;
wherein the first optical coupler is configured to couple the phase-modulated, amplified optical signals out of the optical resonator after the phase-modulated, amplified optical signals pass through the optical resonator in the second direction.

8. The resonator optical gyroscope of claim 7, wherein the one or more gain elements include a second gain element configured to receive the phase-modulated, amplified optical signals coupled out of the optical resonator by the first optical coupler and to further amplify the phase-modulated, amplified optical signals.

9. The resonator optical gyroscope of claim 7, further comprising one or more pump lasers configured to optically pump the broadband light source and the one or more gain elements.

10. The resonator optical gyroscope of claim 7, further comprising:
at least one power monitor configured to measure the power level of the amplified optical signals; and
at least one control circuit configured to adjust the one or more gain elements based on the measured power level of the optical signals.

11. A method of operating a resonator optical gyroscope, comprising:
generating, with a broadband light source, optical signals having a broadband frequency range;
coupling, with a first optical coupler, the optical signals into an optical resonator to propagate in a first direction;
coupling, with a second optical coupler, the optical signals out of the optical resonator after the optical signals pass through the optical resonator in the first direction;
amplifying, with one or more gain elements, the optical signals coupled out of the optical resonator by the second optical coupler to generate amplified optical signals;

coupling, with the second optical coupler, the amplified optical signals into the optical resonator to propagate in a second direction;

coupling, with the first optical coupler, the amplified optical signals out of the optical resonator after the optical signals pass through the optical resonator in the second direction;

generating, with a photodetector, electrical signals corresponding to the amplified optical signals; and determining a rotation rate based on the electrical signals.

12. The method of claim 11, further comprising applying a phase modulation to the optical signals coupled out of the optical resonator by the second optical coupler.

13. The method of claim 11, further comprising optically pumping the broadband light source and the one or more gain elements using a single pump laser.

* * * * *